Sept. 12, 1939.  H. DREYER  2,172,867

DIE HOLDER FOR METAL EXTRUSION PRESSES

Filed Sept. 11, 1937

INVENTOR
Hans Dreyer

Patented Sept. 12, 1939

2,172,867

UNITED STATES PATENT OFFICE 2,172,867

DIE HOLDER FOR METAL EXTRUSION PRESSES

Hans Dreyer, Dusseldorf, Germany, assignor to Schloemann Aktiengesellschaft, Dusseldorf, Germany, a corporation of Germany Application September 11, 1937, Serial No. 163,468
In Germany September 15, 1936

4 Claims. (Cl. 207—17)

My invention relates to means for mounting the dies of metal extrusion presses by which rods, shapes, and tubes of different sizes and contours are manufactured. The invention has particular reference to die holders which are displaceable in the direction of the axis of the press, so as to be removable from the latter for replacing the die after each extruding operation, the die being only loosely fitted into the holder. Die holders of this type are usually clamped firmly against the cross beam of the press by means of a wedge which engages the die holder at its rear end and which takes up also the pressure exerted on the die during the extruding operation.

Die holders of this type must have a central bore or aperture the diameter of which has to be so great as to allow for the free passage of the largest extruded cross section for which the particular die holder is to be used. On the other hand die holders are rather expensive owing to the fact that they must be made of special alloy steel and require a great deal of machining. This makes it desirable to adapt one and the same die holder for as wide a range of extruded cross sections as possible in order to avoid the necessity of having to stock a large number of die holders for one press.

It is an object of my invention to provide a die holder for metal extrusion presses which can be readily adapted for dies for extruding various cross sections without undue strains on its pressure transmitting surfaces.

It is a further object of my invention to provide a die holder for metal extrusion presses which is so shaped as to house an assembly of pressure transmitting parts which are easily interchangeable.

In the accompanying drawing, I have illustrated an embodiment of my invention by way of example.

Figure 1:
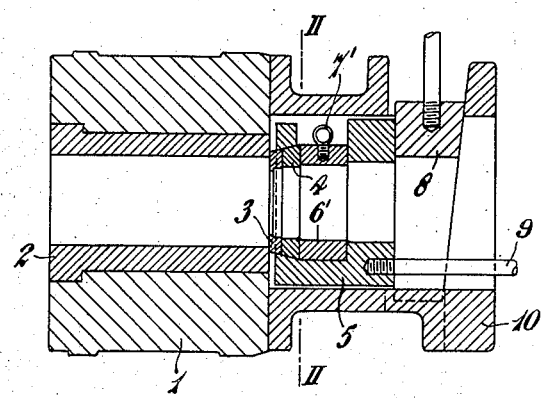
Fig. 1 is a side view, partly in section of a die holder of an extrusion press and its associated parts, fitted with a die for extruding large cross sections.

In the drawing, I indicates the billet container of an ordinary metal extrusion press, having a sleeve 2 which surrounds its bore. At the rear end of this bore the die 3 of the press is located which is supported in its position by a conical plate 4. These two parts are arranged within an aperture of the front wall of die holder 5 which axially is of U-shaped cross section for housing interchangeably one of a number of filling plates 6', 6''. The filling plates as well as the rear wall of the die holder are apertured to offer a free passage to the extruded material. The filling plates 6', 6'' are provided with eyes 7', 7'' in order to be able to easily replace them by means of a crane or any other suitable means. The die holder is clamped in its position by means of a wedge 8 which co-operates with the fixed cross beam 10 and is axially displaceable by means of a rod 9 in order to remove it out of the press together with the parts carried by it.

The pressure which is exerted on the die is transmitted by the ring shaped surface of the parts 4, 6' and 6'' to the rear wall of the die holder and from there to the wedge 8 and fixed cross beam 10. The apertures in the filling plates 6', 6'' must be of such size so as to allow the extruded material to freely pass through them and have therefore to correspond to the dimension of the die, these apertures having diameters which progressively increase axially from the die. On the other hand the surface surrounding these apertures must be large enough to transmit this pressure without undue strain. This makes it necessary to use filling plates of various sizes, according to the dimension of the die.

Figure 2:
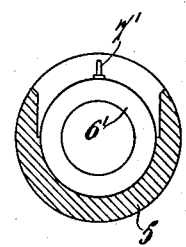
Fig. 2 is a section along the line II—II of Fig. 1.
Figure 3:
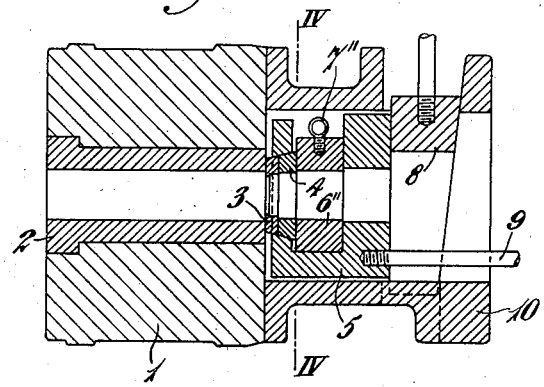
Fig. 3 shows the die holder of Fig. 1 fitted with a die for extruding small cross sections.
Figure 4:
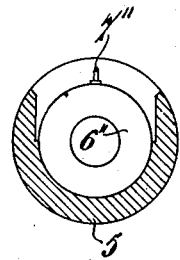
Fig. 4 is a section along the line IV—IV of Fig. 3.

The drawing shows how one and the same die holder can be used for a die having a wide aperture (Figs. 1 and 2) or for a die having a narrow aperture (Figs. 3 and 4). It is only necessary to interchange the filling plates. This can however be easily accomplished as they are only loosely fitted into the die holder.

I claim as my invention:

1. In an extrusion press, the combination with a billet container, of die mounting means including a fixed cross beam axially spaced from the container, a die holder of U-shaped axial cross-section inserted axially between the container and the cross beam, a die interchangeably mounted in the leg of the holder adjacent the container, removable plates for locating the die in said leg, of which at least one is an interchangeable filler plate, and a wedge-shaped clamping member operable between the second leg of the holder and the cross beam, the said mounting means having axial clearing apertures which progressively increase in diameter from the die.

2. For an extrusion press, a die holder of U-shaped axial cross-section of which the two legs are axially spaced to house interchangeable filler plates, one leg being apertured to receive a die, and a supporting plate adapted to be positioned by the filler plates, and the second leg of the holder having a clearing aperture co-axial with the die-receiving aperture of the first leg.

3. For an extrusion press, the provision of a die holder of U-shaped axial cross-section, a conical die and suporting plate fitting in a conical aperture in one leg of the holder, and a plurality of filler plates for interchangeable mounting between the supporting plate and the second leg of the holder, the said plates and the second leg of the holder having clearing apertures coaxial with and progressively increasing in diameter from the die.

4. For a die holder of axial U-shaped cross-section of which one leg is apertured to receive a die and an annular supporting plate, and the second leg is provided with a clearing aperture coincident with the die-receiving aperture, a ring-shaped filler plate having a width not more than the spacing betwen the legs of the holder so that it can be interchangeably positioned in the holder between the support plate and the second leg, a cylindrical inner surface formed about a diameter greater than that of the aperture of the support plate, and opposite pressure-applying surfaces extending radially outwards from the edges of said inner surface for co-operation with corresponding surfaces surrounding the apertures in the support plate and the second leg of the holder respectively.

HANS DREYER.